(12) United States Patent
Chai et al.

(10) Patent No.: US 11,575,688 B2
(45) Date of Patent: Feb. 7, 2023

(54) METHOD OF MALWARE CHARACTERIZATION AND PREDICTION

(71) Applicant: SRI International, Menlo Park, CA (US)

(72) Inventors: Sek Chai, Princeton, NJ (US); Michael E. Locasto, Lebanon, NJ (US); Scott Oberg, Paso Robles, CA (US); Nicholas Vitovitch, New York, NY (US)

(73) Assignee: SRI International, Menlo Park, CA (US)

( * ) Notice: Subject to any disclaimer, the term of this patent is extended or adjusted under 35 U.S.C. 154(b) by 115 days.

(21) Appl. No.: 16/402,219

(22) Filed: May 2, 2019

(65) Prior Publication Data
US 2019/0342308 A1 Nov. 7, 2019

Related U.S. Application Data

(60) Provisional application No. 62/665,838, filed on May 2, 2018.

(51) Int. Cl.
*H04L 9/40* (2022.01)

(52) U.S. Cl.
CPC ........ *H04L 63/1416* (2013.01); *H04L 63/145* (2013.01); *H04L 63/1425* (2013.01)

(58) Field of Classification Search
CPC ...... G06F 21/56; G06F 21/561; G06F 21/564; G06F 21/562; G06F 21/566;
(Continued)

(56) References Cited

U.S. PATENT DOCUMENTS

| 6,704,874 B1* | 3/2004 | Porras ................ H04L 63/1458 709/224 |
| 7,424,619 B1* | 9/2008 | Fan ........................ G06F 21/552 713/188 |

(Continued)

OTHER PUBLICATIONS

D. Yu, G. Sheikholeslami, and A. Zhang, "Findout: finding outliers in very large datasets," Knowledge and Information Systems, vol. 4, No. 4, pp. 387-412, 2002.
(Continued)

*Primary Examiner* — Khang Do
(74) *Attorney, Agent, or Firm* — Moser Taboada

(57) ABSTRACT

A method, apparatus and system for malware characterization includes receiving data identifying a presence of at least one anomaly of a respective portion of a processing function captured by at least one of each of at least two different sensor payloads and one sensor payload at two different times, determining a correlation between the at least two anomalies identified by the data captured by the at least one sensor payloads, and determining a presence of malware in the processing function based on the determined correlation. The method, apparatus and system can further include predicting an occurrence of at least one anomaly in the network based on at least one of current sensor payload data or previously observed and stored sensor payload data, recommending and/or initiating a remediation action and reporting a result of the malware characterization to a user.

20 Claims, 7 Drawing Sheets

(58) Field of Classification Search
CPC ...... G06F 21/552; G06F 21/554; G06F 21/55; H04L 63/1416; H04L 63/1425; H04L 63/14; H04L 63/145; H04L 63/1441
See application file for complete search history.

(56) References Cited

U.S. PATENT DOCUMENTS

| | | | | |
|---|---|---|---|---|
| 8,065,712 | B1* | 11/2011 | Cheng | H04L 63/105 726/1 |
| 8,214,904 | B1* | 7/2012 | Doukhvalov | G06Q 10/10 726/26 |
| 8,955,122 | B2* | 2/2015 | Gu | G06F 21/552 726/23 |
| 9,112,895 | B1* | 8/2015 | Lin | H04L 63/1425 |
| 9,578,050 | B1* | 2/2017 | Barabash | H04L 63/1408 |
| 9,635,039 | B1* | 4/2017 | Islam | H04L 63/1425 |
| 10,171,483 | B1* | 1/2019 | Banerjee | H04L 63/1416 |
| 10,291,637 | B1* | 5/2019 | Bardenstein | H04L 63/1408 |
| 10,454,950 | B1* | 10/2019 | Aziz | H04L 63/1441 |
| 10,623,429 | B1* | 4/2020 | Vines | H04L 43/0882 |
| 10,706,149 | B1* | 7/2020 | Vincent | G06F 21/566 |
| 10,728,264 | B2* | 7/2020 | Bhatt | H04L 63/1433 |
| 11,032,307 | B2* | 6/2021 | Tsironis | H04L 41/0681 |
| 11,423,143 | B1* | 8/2022 | Lin | G06F 21/554 |
| 2011/0197280 | A1* | 8/2011 | Young | H04L 63/1416 726/24 |
| 2012/0137367 | A1* | 5/2012 | Dupont | G06F 21/00 726/25 |
| 2013/0298244 | A1* | 11/2013 | Kumar | H04L 67/10 726/25 |
| 2014/0047544 | A1* | 2/2014 | Jakobsson | G06F 21/55 726/23 |
| 2014/0165207 | A1* | 6/2014 | Engel | H04L 41/069 726/25 |
| 2014/0310811 | A1* | 10/2014 | Hentunen | H04L 61/305 726/23 |
| 2016/0182539 | A1* | 6/2016 | Edwards | G06F 21/82 726/23 |
| 2016/0219066 | A1* | 7/2016 | Vasseur | H04L 63/1425 |
| 2016/0294773 | A1* | 10/2016 | Yu | H04L 63/1425 |
| 2016/0359870 | A1* | 12/2016 | Gu | H04L 63/1416 |
| 2017/0093907 | A1* | 3/2017 | Srivastava | H04L 41/12 |
| 2017/0139777 | A1* | 5/2017 | Gehrmann | G06F 11/0757 |
| 2017/0295188 | A1* | 10/2017 | David | H04L 63/101 |
| 2018/0027004 | A1* | 1/2018 | Huang | H04L 43/08 726/23 |
| 2018/0219889 | A1* | 8/2018 | Oliner | G06N 3/08 |
| 2018/0314835 | A1* | 11/2018 | Dodson | G06F 21/552 |
| 2018/0324199 | A1* | 11/2018 | Crotinger | G06F 16/248 |
| 2019/0102276 | A1* | 4/2019 | Dang | H04L 67/1097 |
| 2019/0156039 | A1* | 5/2019 | Harsany | G06F 21/568 |
| 2019/0182280 | A1* | 6/2019 | La Marca | H04L 43/16 |
| 2019/0260781 | A1* | 8/2019 | Fellows | H04L 63/20 |
| 2019/0281078 | A1* | 9/2019 | Eguiarte Salazar | H04L 41/0654 |
| 2019/0306183 | A1* | 10/2019 | Yermakov | H04L 43/062 |
| 2019/0311120 | A1* | 10/2019 | Jaenisch | G06F 21/554 |
| 2020/0067969 | A1* | 2/2020 | Abbaszadeh | G06K 9/6269 |
| 2020/0287922 | A1* | 9/2020 | Wang | H04L 63/1416 |

OTHER PUBLICATIONS

B. Parno, A. Perrig, and V. Gligor, "Distributed detection of node replication attacks in sensor networks," in Security and Privacy, 2005 IEEE Symposium on, pp. 49-63, IEEE, 2005.

K. Das and J. Schneider, "Detecting anomalous records in categorical datasets," in Proceedings of the 13th ACM SIGKDD international conference on Knowledge discovery and data mining, pp. 220-229, ACM, 2007.

P. Oman and M. Phillips, "Intrusion detection and event monitoring in scada networks," Critical Infrastructure Protection, pp. 161-173, 2007.

D. M. Farid and M. Z. Rahman, "Learning intrusion detection based on adaptive bayesian algorithm," in Computer and Information Technology, 2008. ICCIT 2008. 11th International Conference on, pp. 652-656, IEEE, 2008.

C. Zimmer, B. Bhat, F. Mueller, and S. Mohan, "Time-based intrusion detection in cyber-physical systems," in Proceedings of the 1st ACM/IEEE International Conference on Cyber-Physical Systems, pp. 109-118, ACM, 2010.

A. Carcano, A. Coletta, M. Guglielmi, M. Masera, I. N. Fovino, and A. Trombetta, "A multidimensional critical state analysis for detecting intrusions in scada systems," IEEE Transactions on Industrial Informatics, vol. 7, No. 2, pp. 179-186, 2011.

Q. He and R. S. Blum, "Smart grid monitoring for intrusion and fault detection with new locally optimum testing procedures," in Acoustics, Speech and Signal Processing (ICASSP), 2011 IEEE international Conference on, pp. 3852-3855, IEEE, 2011.

A. A. Elhadi, M. A. Maarof, and A. H. Osman, "Malware detection based on hybrid signature behaviour application programming interface call graph," American Journal of Applied Sciences, vol. 9, No. 3, p. 283, 2012.

R. Mitchell and R. Chen, "Behavior rule based intrusion detection for supporting secure medical cyber physical systems," in Computer Communications and Networks (ICCCN), 2012 21st International Conference on, pp. 1-7, IEEE, 2012.

A. Jones, Z. Kong, and C. Belta, "Anomaly detection in cyber-physical systems: A formal methods approach," in Decision and Control (CDC), 2014 IEEE 53rd Annual Conference on, pp. 848-853, IEEE, 2014.

L. Liu, M. Esmalifalak, Q. Ding, V. A. Emesih, and Z. Han, "Detecting false data injection attacks on power grid by sparse optimization," IEEE Transactions on Smart Grid, vol. 5, No. 2, pp. 612-621, 2014.

R. Mitchell and 1.-R. Chen, "A survey of intrusion detection techniques for cyber-physical systems," ACM Computing Surveys (CSUR), vol. 46, No. 4, p. 55, 2014.

P. Malhotra, L. Vig, G. Shroff, and P. Agarwal, "Long shortterm memory networks for anomaly detection in time series," in Proceedings, p. 89, Presses universitaires de Louvain, 2015.

A. Hoehn and P. Zhang, "Detection of covert attacks and zero dynamics attacks in cyber-physical systems," in American Control Conference (ACC), 2016, pp. 302-307, IEEE, 2016.

J. Zhao, J. Wang, and L. Yin, "Detection and control against replay attacks in smart grid," in Computational Intelligence and Security (CIS), 2016 12th International Conference on, pp. 624-627, IEEE, 2016.

P. Malhotra, A. Ramakrishnan, G. Anand, L. Vig, P. Agarwal, and G. Shroff, "Lstm-based encoder-decoder for multi-sensor anomaly detection," arXiv preprint arXiv:1607.00148, 2016.

* cited by examiner

METHOD OF MALWARE CHARACTERIZATION AND PREDICTION

CROSS-REFERENCE TO RELATED APPLICATIONS

This application claims priority to and the benefit of U.S. Provisional Patent Application Ser. No. 62/665,838, filed May 2, 2018, which is incorporated herein by this reference in its entirety.

GOVERNMENT RIGHTS

This invention was made with Government support under contract no. FA8750-16-C-0179 awarded by the Air Force Research Laboratory and under grant no. 1526399 awarded by the National Science Foundation. The Government has certain rights in this invention.

FIELD

Embodiments of the present principles generally relate to cyber security, and more particularly, to a method of malware characterization and prediction.

BACKGROUND

Modern software is complex and operates in parallel with very intricate data dependencies among different threads. Malware that has infected a computer can easily hide, making a detection of such malware very challenging especially when the presence of code that can alert to the existence of malware is subtle.

Malware characteristics include location, appearance, communication, propagation methods, and target environment impact. Malware Characterization is the process of identifying malware characteristics, and in general, the process is manual, slow, and labor-intensive. No integrated framework and automation exists that provides intelligent guidance and assistance to the human analyst, and there is no automated or semi-automated means to combine multiple pieces of malware characteristics to create a cyber-weapon profile. Current standard practice in malware detection is a static one-way flow of information, from sensed output to analysis, comprising of comparisons of malware signatures against a stored database. This approach leads to a weakness in the ability to cover large areas of the computing platform with low latency, and the ability to dynamically tune and adapt to malware characteristics.

More specifically, the process of Localization to find all malware-infected devices currently requires advanced technical skills and is very time consuming. Traditional IT network scanning tools cannot be used to locate devices, as these often cause industrial control systems (ICS) devices to crash. Today, humans must manually locate and inspect each device for infection.

Furthermore, Remediation, a process of planning and taking the actions necessary to restore devices and the overall system to proper function, is also manual and tedious with no automated support.

SUMMARY

Embodiments of a method, apparatus and system for malware characterization and prediction are disclosed herein.

In some embodiments in accordance with the present principles, a method for malware characterization includes receiving data identifying a presence of at least one anomaly of a respective portion of a processing function captured by at least one of each of at least two different sensor payloads and one sensor payload at two different times, determining a correlation between the at least two anomalies identified by the data captured by the at least one sensor payloads, and determining a presence of malware in the processing function based on the determined correlation.

In some embodiments, the method can further include can further include predicting an occurrence of at least one anomaly in the processing function based on at least one of current sensor payload data or previously observed and stored sensor payload data, recommending and/or initiating a remediation action and reporting a result of the malware characterization to a user.

In some embodiments in accordance with the present principles, an apparatus for malware characterization includes a receiving/clustering module configured to receive data identifying a presence of at least one anomaly of a respective portion of a processing function captured by at least one of each of at least two different sensor payloads and one sensor payload at two different times, determine a correlation between the at least two anomalies identified by the data captured by the at least one sensor payloads, and determine a presence of malware in the processing function based on the determined correlation In some embodiments, the receiver/clustering module includes a local state mapping/clustering module to receive the data identifying the presence of at least one anomaly in the respective portion of the processing function from the at least one sensor payloads and a global/historical analysis module to receive the data identifying the presence of at least one anomaly in the respective portion of the processing function from the storage device.

In some embodiments the apparatus can further include a recommendations module to at least one of recommend and initiate a remediation action including at least one of requesting to or re-flashing a device, requesting to or isolating an infected device, and requesting to or re-tasking a sensor payload.

In some embodiments the apparatus can further include a reporter module to generate a report including a summary of a result of the receiver/clustering module.

In some embodiments, the receiver/clustering module is further configured to predict an occurrence of at least one anomaly in the processing function on at least one of current sensor payload data and previously observed and stored sensor payload data.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
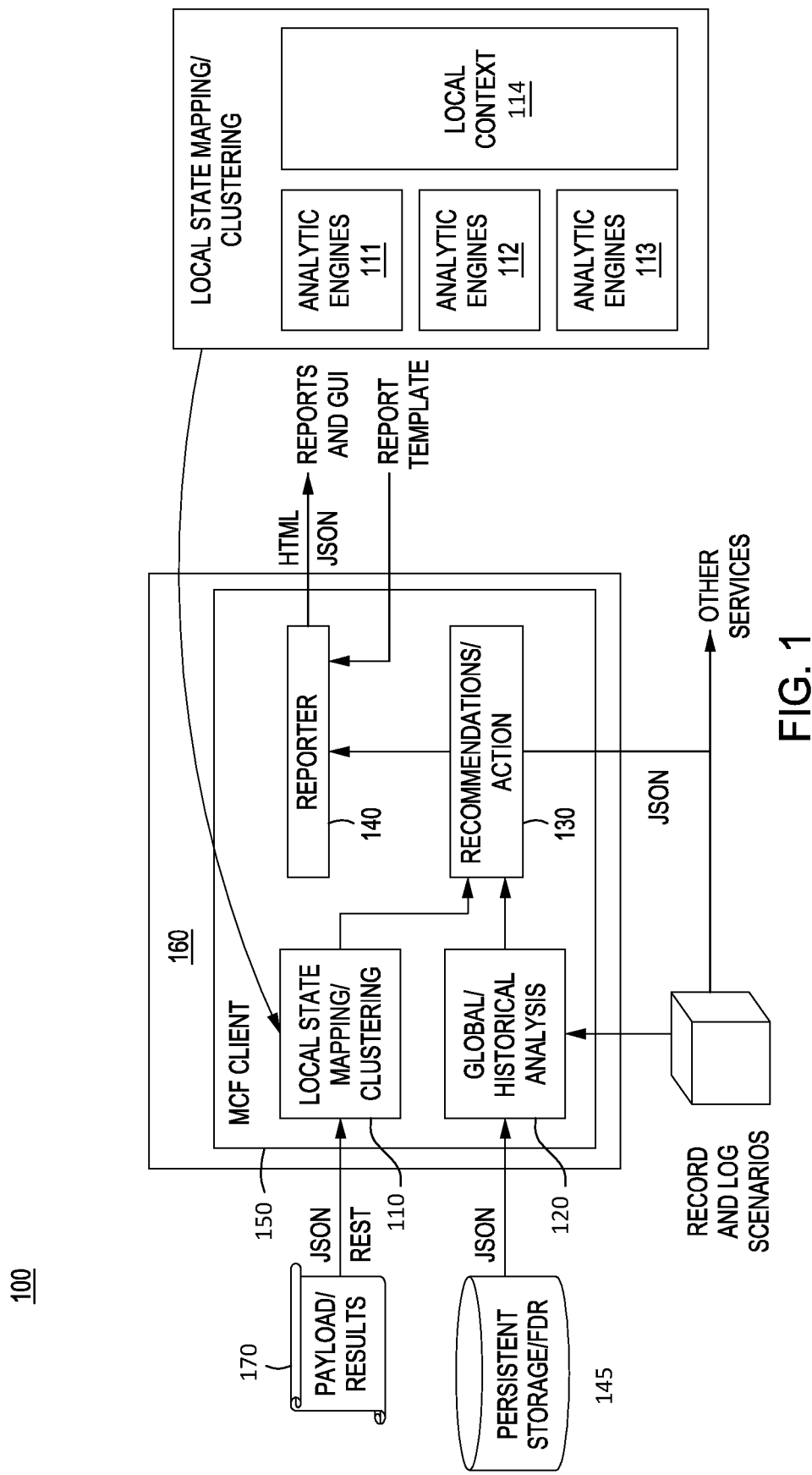
FIG. 1 depicts a high level block diagram of a Malware Characterization Framework (MCF) system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to a method, apparatus and system for malware characterization and prediction. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to an industrial control system (ICS), such teachings should not be considered limiting. Embodiments in accordance with the present principles can be implemented in substantially any cyber-physical system or other computing system for malware characterization and prediction within the concepts of the present principles.

The terms sensor and payload are used herein interchangeably and in combination to refer to software and hardware mechanisms that help profile processor/device operation. The collected information can include malware identifying evidence such as static disassemblies of suspected malware code, annotated data comparisons between nominal and anomalous (modified) data (binary, text, time-series), malicious protocol messages/communications, and other relevant information. The sensor payload data can be be used downstream for analysis to help in a localization process, to raise confidence on malware detection and to find other similarly infected devices.

In some embodiments, the term correlate as used herein in the broadest sense is used to refer to any statistical association, though correlate can also commonly refer to the degree to which a pair of variables are linearly related. Correlations are useful because they can indicate a predictive relationship that can be exploited in practice and as described herein.

In some embodiments, an approach to malware characterization and prediction in accordance with the present principles leverages information from a heterogeneous collection of sensor payloads. Some example sensor payloads include a memory integrity analysis, processor execution analysis, network traffic analysis, and anomaly analysis to name a few. Embodiments of the present principles advantageously leverage a combination of complementary detection mechanisms (e.g., sensor payloads) to efficiently identify changes to baseline system behaviors evidenced by anomalies in the functionality of a processor-based system. In accordance with embodiments of the present principles, the results of the complementary detection mechanisms are correlated to identify a location or source of suspected malware. Although throughout the teachings herein it will be described that data from sensors is correlated, in some embodiments in accordance with the present principle, data from a same sensor can be correlated. That is, in some embodiments, data captured by a same sensor at two different times can also be correlated.

In accordance with the preset principles, heterogeneous sensors provide discrete data streams with different properties and alignment. Advantageously, in some embodiments in accordance with the present principles, the sensor information is fused together to formulate an efficient behavior/activity representation of a subject system. In comparison, the traditional approach to malware detection using static CFG (control flow graph) analysis is likely to miss the effects of the malware because the distinguishing activity is well hidden. Much like forensic analysis where footprints on mud can be used as evidence in a crime scene, embodiments of the present principles provide evidence from correlated sensor payloads (memory, processor, network, etc.) to detect a possible presence of malware.

In addition, in some embodiments, activity in side channels can also be used for malware characterization and prediction in accordance with the present principles. In such embodiments, side channels comprise "indirect measurements" of the primary properties/behaviors of processing functions via, for example measurements of computation, communication, and storage. The indirect measurements are side channels in the sense that the measurements do not directly arise from the operation of those elements themselves (i.e., functions are not directly reported by those elements or come from a specific interrupt of the code & CPU). In some embodiments, side channels can include sampling of hardware performance counters, modeling of cache hits & misses (by running timing code in other processes), RF & EM observations, and the like. Specifically, some examples of side-channels include temperature variations, cooling fan vibrations, timing of burst network transmissions and the like. The side-channels can also be used as inputs to a deep learning system to train upon and to identify anomalous behaviors in accordance with the present principles. Such side-channel observations can be important, for example, for IOT devices, where it is more difficult to task a sensor on a resource-limited processor/memory-subsystem.

Some embodiments in accordance with the present principles take advantage of a baseline characterization of normal behaviors of processing functions of a subject system to detect from sensor information the dynamic effects of possible malware in the system that can be identified as abnormal processor behavior. Abnormal behavior is flagged as anomalous and identified as possible malware infection. By inverting the problem to learn a normal operational baseline instead of specific malwares in accordance with the present principles, embodiments of the present principles are able to identify malware, and even zero-day attacks, and react quickly for malware mitigation.

In some embodiments, a baseline characterization profile of normal behaviors of processing functions of a subject system can be learned/trained using machine learning algorithms and the observation of normal processing functions.

Alternatively or in addition, in some embodiments, an inferred inspection process can be used to determine a baseline characterization profile of normal behaviors of processing functions of a subject system in accordance with the present principles. The term 'inferred specification' refers to an inference procedure that attempts to derive a model of non-anomalous operation by sampling live operations of a group of devices, programs, or other system components and treating this group as a notional baseline. Such an inference is particularly important in environments in which baselines cannot be derived either by static, training-based measurements of a single clean device or program or by manual specification of the rules governing a known good model of system behavior. The inferred specification arises from treating the group of behavioral baselines as the input to a procedure that finds commonalities and weights them via some mechanism (for example, by majority vote, by reference to some other documentation or ground truth, or by the operation of some automated mechanism for assessing or subjecting a record of behavior to a set of tests). The output of the inference procedure can include a specification of system behavior that can be treated as a baseline and can be used by the MCF or by the individual sensors to compare the behavior of a device under test with the inferred specification.

Alternatively or in addition, even without knowing a normal operational baseline, in some embodiments, data received regarding anomalies in processor behavior can be correlated to determine the possibility of the existence of malware.

FIG. 1 depicts a high level block diagram of a Malware Characterization Framework (MCF) system 100 in accordance with the present principles. The MCF system 100 of FIG. 1 illustratively comprises an MCF client 150 comprising a local state mapping/clustering module 110, a global/historical analysis module 120, a recommendations module 130 and an optional reporter module 140. The MCF system 100 illustratively further comprises a storage device 145. Although throughout the teachings of the present principles, the storage device 145 is implemented for storing data to be recalled at a later time, in some other embodiments data can be stored, for example, on the sensor (i.e., evaluator container with storage), sometimes on the MCF (i.e., internal storage) and mixed.

As depicted in FIG. 1, embodiments of an MCF client, such as the MCF client 150 of FIG. 1, can be implemented in a computing platform 160 (described in greater detail in FIG. 5) in accordance with the present principles. That is, in some embodiments, the MCF client 150 comprises a software client, with inputs and outputs from the computing platform 160. In such embodiments, the MCF 150 can be implemented as a stand-alone service that is initiated by the user or software application using the computing platform 160 as a dedicated server. Alternatively or in addition, in some embodiments, the MCF 150 can be implemented as persistence service of a system server, in which the MCF 150 can actively query deployed payloads. In such embodiments, the persistence service can be accomplished using a defined Payload API (application program interface) that supports direct query to the sensors/payloads.

As depicted in FIG. 1, the local state mapping/clustering module 110 of the MCF 150 receives payload results 170 from a plurality of system sensors. In some embodiments, the sensor outputs can be embodied as a report in JavaScript Object Notation (json) format. In several embodiments, the sensor outputs are described as payloads, since, in such embodiments, a sensor can comprise a software instrument designed to capture different aspects of processor behavior. For example, a sensor payload can be used to capture memory utilization. Another sensor payload can be used to capture processor utilization. In some embodiments, the sensor payload can be installed or already resident on a device/system under test, in a cooperative or uncooperative manner (e.g. a user may willingly want the sensor payload as part of its defensive process or a user may be unaware of the presence of the sensor payload).

In some embodiments, each sensor payload communicates data to the MCF 150 at which the MCF 150 analyzes the data and determines if an anomaly exists in the data. In other embodiments described herein, however, each sensor payload can process collected data and provide results 170 to the MCF 150 in the form of metadata that describes the analysis (e.g. detection of anomalous events). Metadata can include: process name, process ID (PID), timestamp, memory location, and a device universal unique ID (UUID). A summary of analysis performed at the payload level can include feature(s) indicative of an anomaly, and a confidence of a result.

The local state mapping/clustering module 110 of the MCF 150 analyzes sensor payload data to generate a collective result. In some embodiments in accordance with present principles, the local state mapping/clustering module 110 implements a fusion process of reasoning for the metadata in the payload results 170. For example, for anomaly detection, a simple fusion process of the local state mapping/clustering module 110 can include a positive detection reasoning process indicative of possible malware infection identified as an anomaly in a behavior of a system for which the payload results 170 were provided, which in some embodiments uses a logical OR of all of the sensor payload metadata.

As depicted in the exploded view of the local state mapping/clustering module 110 on the right side of FIG. 1, in some embodiments in accordance with the present principles, the local state mapping/clustering module 110 can comprise at least one analytic engine (illustratively three analytic engines 111, 112 and 113) and a local context module 114. The analytic engines 111, 112, and 113 of the local state mapping/clustering module 110 can be implemented to interpret data/results communicated from sensor payloads. For example, in some embodiments, the local state mapping/clustering module 110 makes a determination regarding the existence of anomalies based on the results of the data communicated from the sensor payloads. That is, in some embodiments, the local state mapping/clustering module 110 sets a threshold above which data having an anomaly with a high enough confidence score can be considered as a true anomaly and possible malware. In some embodiments, the determination can include a confidence or rank established from the sensor data. If the confidence or rank exceeds an established threshold, a determination is asserted of, for example, an existence of malware (e.g., statistical percentile or artifact identifications and associations (Indicators of Compromise)).

In some embodiments, behavior profiles of sensor data can be collected and associated with a trust factor depending on the collection source. For example a baseline profile can imply that data came from a highly trusted source origin. Alternatively, a baseline may not exist or properly represent a device operating in a different role or environment. Sensor payloads can provide their own analysis or sensor data can be aggregated by a MCF 150 that will have more context to correlate data for analysis. The MCF 150 can even present correlation results to a consumer or human operator who can better rank trust or anomalous behavior in accordance with the present principles.

In the embodiment of FIG. 1, the local context module 114 module can be implemented to fuse the results of the analytic engines to, for example, generate a collective result for further processing (described in greater detail below).

Figure 2:
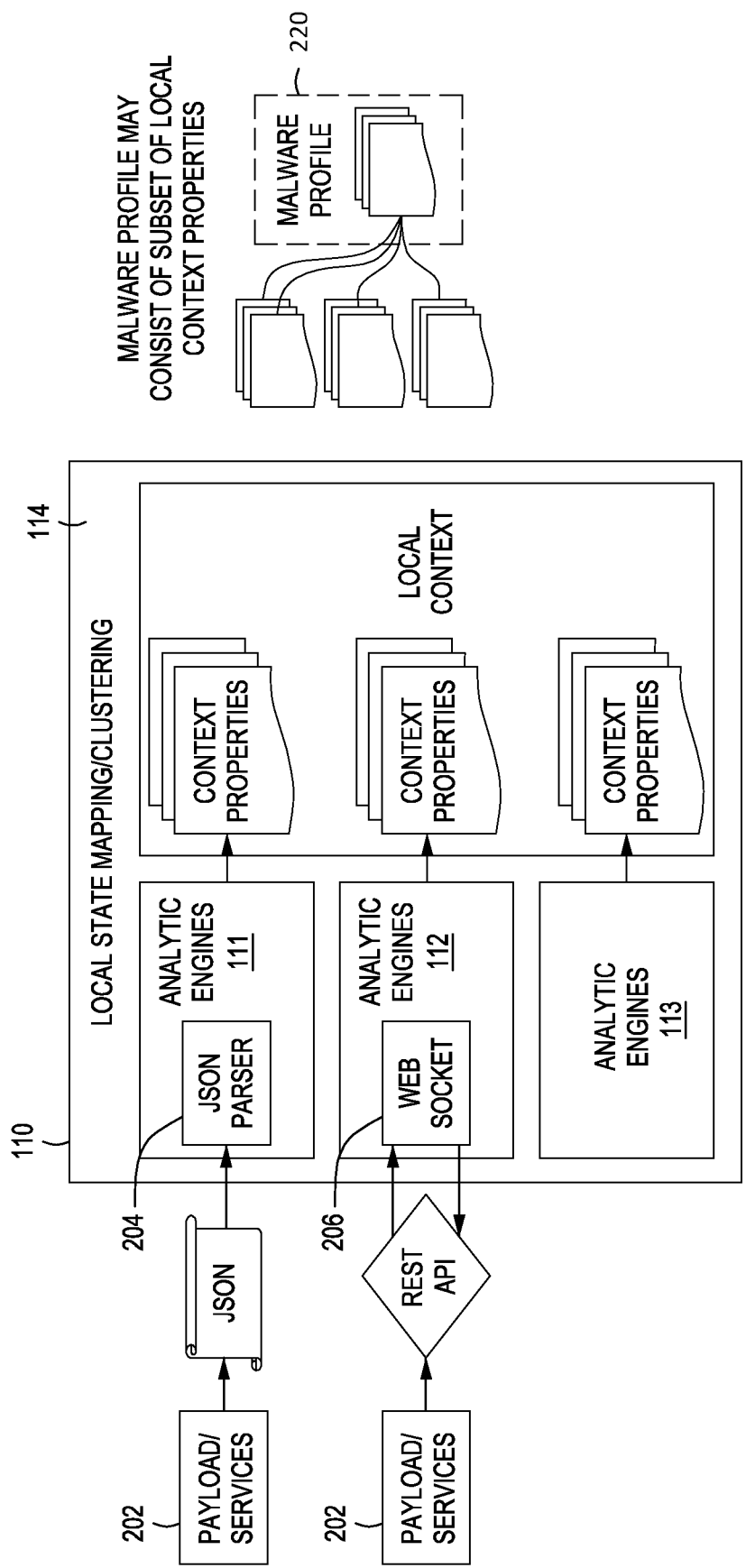
FIG. 2 depicts a functional block diagram of the local state mapping/clustering module in accordance with an embodiment of the present principles.

FIG. 2 depicts a functional block diagram of the local state mapping/clustering module 110 in accordance with an embodiment of the present principles. As depicted in FIG. 2, in some embodiments sensor payloads can communicate data results to the local state mapping/clustering module 110 via a payload service 202 using as a report in JSON format. In the embodiment of FIG. 2, a JSON parser 204 of the first analytic engine 111 of the local state mapping/clustering module 110 receives the sensor payload data, interprets the data and communicates the data to the local context module 114 (illustratively as context properties of the data). As depicted in FIG. 2, the local state mapping/clustering module 110 can receive data results from sensor payloads via other application program interfaces such as a REST API. In the embodiment of FIG. 2, a Web socket 206 of the second analytic engine 112 of the local state mapping/clustering module 110 receives the payload data, interprets the data and communicates the data to the local context module 114. Although in the embodiment of FIG. 2, only JSON and REST API formats/applications are depicted as communicating results of sensor payloads to the local state mapping/clustering module 110, in other embodiments various other communication formats/applications can be implemented to communicate results of sensor payloads to the local state mapping/clustering module 110 in accordance with the present principles.

As depicted in the embodiment of FIG. 2, the local context module 114 of the local state mapping/clustering module 110 clusters/fuses the data from the analytic engines 111, 112, and 113. Although in the embodiment of FIG. 2, the local context module 114 illustratively clusters/fuses the interpreted data from the analytic engines 111, 112 and 113 according to from which analytic engine the data was received, in other embodiments the local context module 114 can cluster/fuse the interpreted data received from the analytic engines 111, 112, and 113 according to commonalities of various properties of the data, which will be described in further detail below with regards to an explanation of clustering. In general, the local context module 114 of the local state mapping/clustering module 110 correlates the interpreted data received from the analytic engines 111, 112, and 113 to generate a malware profile 220 of possible malware identified from the data received by the local state mapping/clustering module 110 from the sensor payloads regarding anomalies detected in the behavior/functionality of a target device. In some embodiments in accordance with the present principles, the malware profile 220 can consist of at least some or all of the data/groups of data clustered/fused by the local context module 114.

Referring back to FIG. 1, the global/historical analysis module 120 analyzes persistent storage and record logs recorded, for example in the storage device 145, to generate a collective result based on results across multiple federated networks. In essence, the global/historical analysis module 120 performs a fusion process of reasoning metadata of the sensor payload results over time, as similarly described above with reference to the fusion associated with the local state mapping/clustering module 110. In some embodiments, the stored log files can be log files stored from one or more MCF clients in accordance with the present principles. The logs can provide historical information about server operation, and global states shared from a federated system comprising of MCF clients in accordance with the present principles. In some embodiments, examples of metadata related to server operation can include: payload deployed, time start/end, and device UUID and IP.

Although the embodiment of the MCF system 100 of FIG. 1 illustratively depicts the local state mapping/clustering module 110 and the global/historical analysis module 120 as comprising separate modules, in some embodiments in accordance with the present principles the local state mapping/clustering module 110 and the global/historical analysis module 120 can comprise a single module.

Some embodiments of the present principles can implement several ways to fuse the sensor payload interpreted results. For example, in the embodiment of FIG. 2 depicted above, in the local state mapping/clustering module 110 of the MCF 150, an approach is based on clustering the results of the analytic engines 111, 112, and 113. In clustering, a goal is to point to a forensic analysis for Indicators of Compromise (IoC). Examples of Clustering can include, but are not limited to:

Locational—an MCF in accordance with the present principles can group results of sensor payload data based on location, which includes: device, software process, PID, and memory location, to name a few. Simply stated, if different sensor payloads are flagging similar processes with equivalent names/labels, then an MCF will have more confidence on a specific detection/suspicion of malware.

Temporal—an MCF in accordance with the present principles can group results based on time relationships, which can include timestamps. For example, an MCF can group sensor payload results from different devices of similar types if the MCF can show commonality between the temporal events. For example, strong correlation can be made if a timestamp processor-event detection falls within a certain period relative to a network-event-detection (e.g. malware running and generating bad network packets).

Behavioral—an MCF in accordance with the present principles can group results based on sequences of events collected from the sensor payload. This cluster type looks at changes in payload results over time. Consistent detection on a particular payload is a simple example. Changes of reasoning over time can be accomplished (e.g. different triggers of low confidence can yield higher overall detection confidence if the triggers are related).

In a behavioral context, the local state mapping/clustering module 110 can generate multiple groups of detection in any particular cluster type. For example, an MCF can find a cluster of results indicating detection for similar devices (e.g. processors of a certain make/model have similar payload reasoning results). Also, using confidence scores, an MCF can group detection results based on different confidence levels, such that an MCF can find commonality on the payloads results.

Similar to the local state mapping/clustering module 110, the global/historical analysis module 120 can generate groups of detections in clusters based on previously recorded analyses and sensor payload data. As described above, the payload results can be from different federated devices. In some embodiments, an analysis performed is typically based on clusters of similar behavioral sequences analyzed over time (e.g. over a series of captures). In such embodiments, an MCF can be analyzing patterns, logs and persistent store (e.g. information) from previous analysis.

Referring back to FIG. 1, the recommendations module 130 of the local state mapping/clustering module 110 can provide a recommendation (source of action) based on the different state information generated from clustering. In addition or alternatively, in some embodiment the recommendations module 130 can initiate a remediation action. For example, the recommendations module 130 can request to or initiate action from a list of available services. For example in some embodiments, for remediation, the MCF 150 can issue requests or initiate the re-flash of certain devices, or take appropriate action to isolate an infected device from the network. The recommendations module 130 can also request to or initiate a re-task of a sensor payload, for example, re-run a particular sensor payload configured to improve confidence in a detection of an anomaly. For example, in some embodiments, the recommendations module 130 can request to or initiate a re-run of a processor-based sensor payload configured with different sampling rate of the high performance counters.

In addition, in some embodiments the recommendations module 130 can generate an overall confidence score based on the Clustering and Historical analysis determined by the local state mapping/clustering module 110 and the global/historical analysis module 120. In some embodiments, based on a low confidence score of a cluster of devices, the recommendation or action can be to deploy new payloads to attempt to increase the confidence score.

Referring back to FIG. 1, the optional reporter module 140 can generate a Report to be presented to a user. For example, in some embodiments, the optional reporter module 140 can generate a Report based on a format provided by a Report Template (see FIG. 1). In some embodiments, the report can be a human readable file including summary of the results of an MCF analyses. The reports can be time-stamped for future analysis and archival purposes. In some embodiments, the optional reporter module 140 can also generate metadata for visualization via a GUI service that can be provided by, for example, the computing platform 160.

The optional reporter module 140 of the MCF system 100 of FIG. 1 can also be configured to provide MCF outputs in other formats for ingestion into other systems. For example, in some embodiments, the optional reporter module 140 can generate outputs in at least one of a Structured Threat Information Expression (STIX) format and a Trusted Automated Exchange of Indicator Information (TAXII) format. In some embodiments, the optional reporter module 140 can generate MCF outputs for ingestion into an Elasticsearch, Logstash, Kibana (ELK) analytics tool.

In some exemplary embodiments, a system/device to be analyzed includes at least two sensor payloads. In other embodiments a system/device to be analyzed does not include any sensor payloads. In accordance with the present principles, system(s)/device(s) to be analyzed can include a software service that launches the sensor payloads into the system/device if necessary. For example, in some embodiments, all necessary sensor payloads pre-exist in a system/device to be analyzed. In such embodiments, a software service that launches the sensor payloads into the system/device is not necessary. In some embodiments, only some sensor payloads exist in a system/device to be analyzed and some other sensor payloads are provided by a software service that launches the sensor payloads into the system/device. In some embodiments, no needed sensor payloads exist in a system/device to be analyzed and all of the necessary sensor payloads are provided by a software service that launches the sensor payloads into the system/device.

Figure 3:
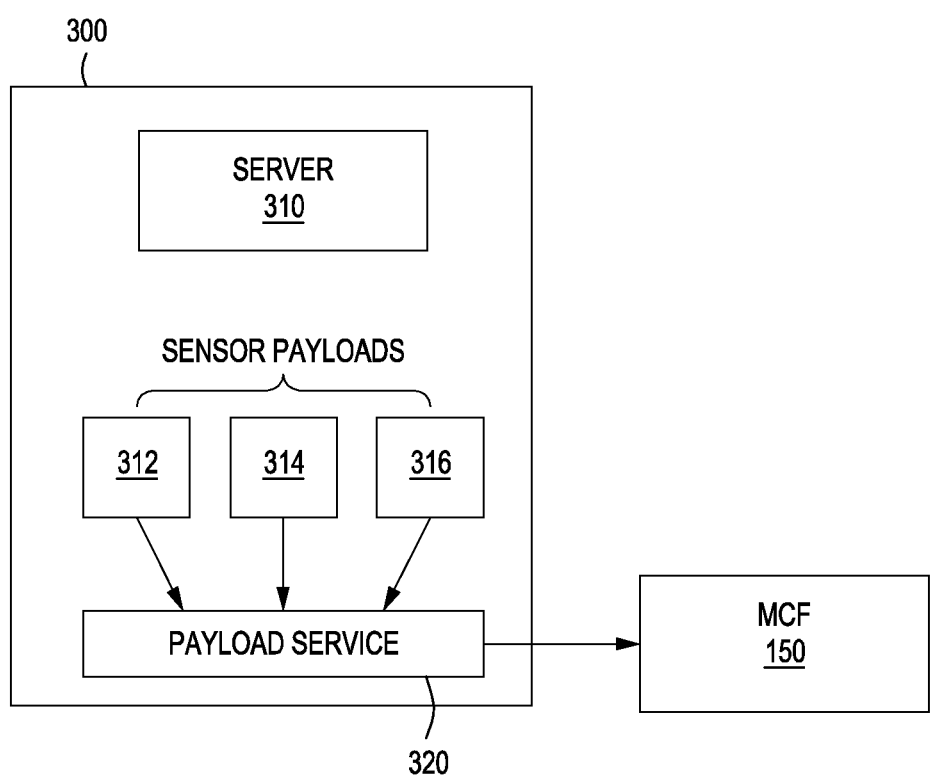
FIG. 3 depicts a high level block diagram of a target device in which an embodiment of the present principles can be implemented.

FIG. 3 depicts a high level block diagram of a target device 300, which in some embodiments can comprise an industrial control system (ICS,) in which an embodiment of the present principles can be implemented. In the embodiment of FIG. 3, the target device 300 comprises a server 310 including firmware and applications. The target device 300 of FIG. 3 further illustratively comprises three implanted sensor payloads 312, 314, and 316 and a sensor payload service 320 for communicating data collected by the sensor payloads 312, 314, and 316 to the MCF 150. Although in the embodiment of FIG. 3, the target device 300 and the MCF 150 are depicted as being separate, in some embodiments an MCF in accordance with the present principles can be implemented as a service which operates in tandem to and on a server of a system/device to be evaluated, providing feedback on system payload results.

In some embodiments, the sensor payloads 312, 314, and 316 of the target device 300 of FIG. 3 can comprise a processor-based sensor payload, a memory-based sensor payload, and a network-based sensor payload. In accordance with the present principles, each sensor payload processes collected data and provides respective results to the MCF 150, for example, in the form of metadata that describes the analysis (e.g. detection of anomalous events).

That is, in some embodiments, each of the sensor payloads collects data regarding a respectively monitored process of the target device 300 and compares the collected data to a known behavior of the respective process, which was previously determined, to identify if an anomaly exists in the behavior of the respective process. For example, the processor-based sensor payload can collect data regarding processor states of a processor (i.e., in the server 310) associated with the target device 300 from at least one hardware performance counter (HPC) associated with the processor. The collected data regarding the processor states can be compared to a previously determined behavior (e.g., normal operational baseline) for the processor of the system/device to be analyzed to determine if an anomaly in the behavior of the processor exists.

Figure 4B:
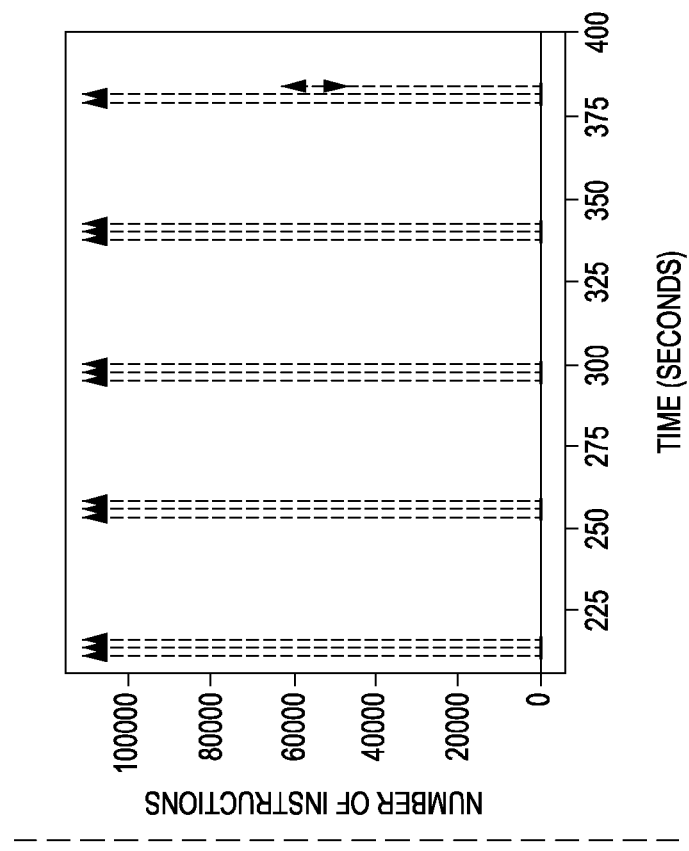
FIG. 4b depicts a graphical representation of data collected by the processor-based sensor payload from a hardware performance counter associated with the processor of the target device captured at a later time after the taking of the normal operational baseline in accordance with an embodiment of the present principles.
Figure 4A:
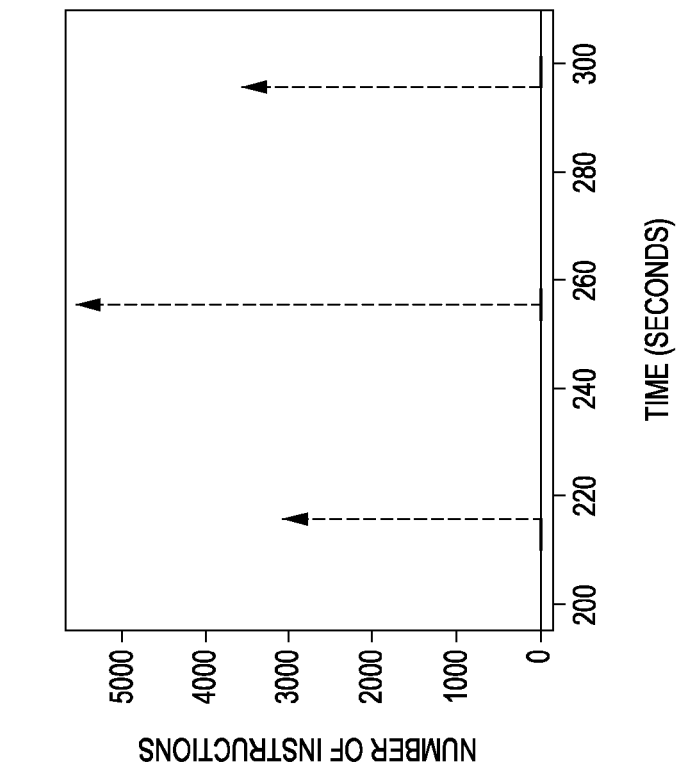
FIG. 4a depicts a graphical representation of an exemplary normal operational baseline of a processor, such as the processor of the target device in FIG. 3, in accordance with an embodiment of the present principles.

For example, FIG. 4a depicts a graphical representation of an exemplary previously determined operational profile (e.g., normal operational baseline) of a processor, such as the processor of the target device 300, in accordance with an embodiment of the present principles. In some embodiments, the operational profile can be determined using, for example, a hardware performance counter at the factory or at a time the system is first put into production. In the embodiment of FIG. 4a, the operational profile of the subject processor comprises three peaks representative of a number of instructions being sent at respective time periods of approximately 215 seconds, 255 seconds and 295 seconds.

FIG. 4b depicts a graphical representation of data collected by the processor-based sensor payload from an HPC associated with the processor of the target device 300 captured at a later time after the taking of the operational profile in accordance with an embodiment of the present principles. As depicted in FIG. 4b, the data collected by the processor-based sensor payload identifies several anomalies not present in the operational profile. More specifically in FIG. 4b, the data collected by the processor-based sensor payload identifies several anomalous events at time periods of approximately 215 seconds, 255 seconds, 295 seconds, 345 seconds and 380 seconds.

As described above, the results of the data collected by the processor-based sensor payload can be communicated to the MCF 150, for example, in the form of metadata that describes the analysis (e.g. detection of anomalous events). That is, the results of FIG. 4a and FIG. 4b can be communicated to the MCF 150.

In addition, the data collected by other sensor payloads is also communicated to the MCF 150, for example, in the form of metadata that describes the analysis (e.g. detection of anomalous events). For example and as described above, a memory-based sensor payload can collect data regarding memory states of the system to be analyzed. The collected data regarding the memory states can be compared to a previously determined operational profiles for the memory states of the system/device to be analyzed to determine if an anomaly in the behavior of the processor exists. The results from the other sensor payloads can also be communicated to the MCF 150.

Figure 6:
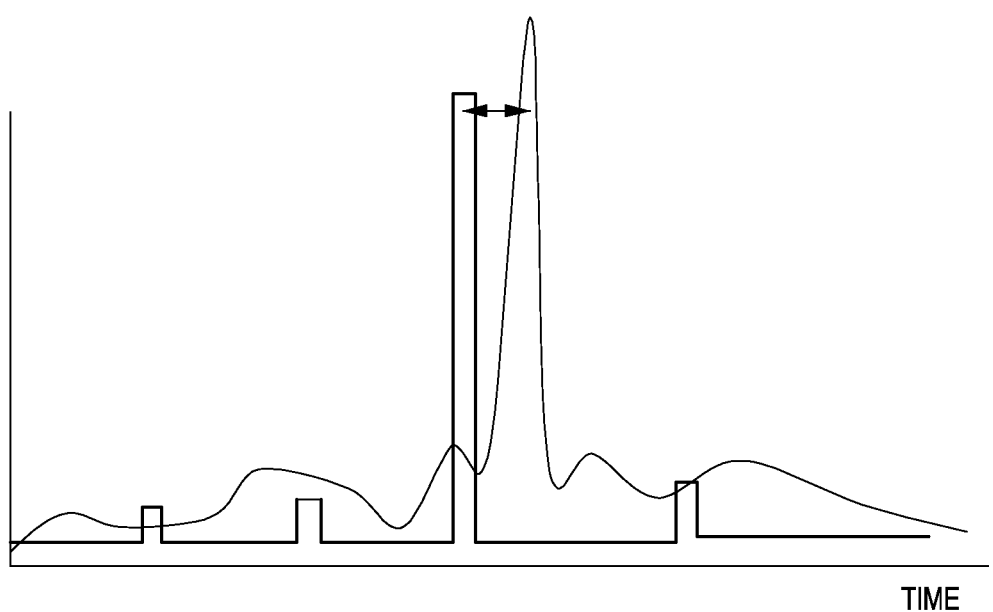
FIG. 6 depicts a graphical representation of the plotting on a common timeline of an anomaly detected by a processor-based sensor payload and a network-based sensor payload to correlate the anomalies in accordance with an embodiment of the present principles.

In accordance with embodiments of the present principles, an MCF of the present principles, such as the MCF 150 of FIG. 1, can correlate the information received from the various sensor payloads to increase detection confidence of suspected malware and, in some embodiments, to generate a malware profile. For example, FIG. 6 depicts a graphical representation of the plotting on a common timeline of an anomaly detected by a processor-based sensor payload and a network-based sensor payload to correlate the anomalies in accordance with an embodiment of the present principles. As depicted in FIG. 6, a strong correlation can be made if a temporal processor-event detection falls within a certain period to a temporal network-event-detection. For example, the time correlation between processor-event detection and the network-event-detection events can assist in determining a malware profile including a source location of suspected malware. For example and with reference to FIG. 6, the time correlation between processor-event detection and the network-event-detection events can assist in determining that malware running on the processor is generating bad network packets. In such a scenario and using such correlation, it can be decided to launch a processor-based sensor payload with greater resolution to look for a more specific profile (e.g. network related threads, etc.). The embodiment of FIG. 6 depicts an example of a correlation of the present principles based on timestamps.

In some embodiments, correlations in accordance with the present principles can be performed by the MCF based on other factors, such as packet content. In such embodiments, an MCF of the present principles, such as the MCF 150 of FIG. 1, can correlate using specific datum or labels. For example, if a network-based sensor payload extracts a unique packet content and presents the content as metadata to the MCF, then the MCF can correlate the content with, for example, metadata from the memory-based sensor payload. For example, even if at the time no specific memory content had been extracted, the MCF can correlate, for example, timestamps and PID/UUID information, and direct the memory-based sensor payload to perform a memory-content check at a specific memory location suggested by the correlation.

That is, sensor payloads can be deployed or reconfigured to target a specific activity (or increase their sample rate). Directed sensor measurements will help maintain expected device performance during nominal operations. The MCF 150 can also coordinate/schedule the sampling of potential malicious activity across a cluster of devices so as to minimize system impact. That is, in some embodiments the MCF 150 can coordinate/schedule the sampling of potential malicious activity across a cluster of devices during normal operation and without having to interfere with normal system processing. In systems with hot/cold spares, the MCF 150 can intelligently activate and sample highly available (HA) and fault tolerant services.

In accordance with embodiments of the present principles, other correlations can be made between data collected by substantially any sensor payload received by an MCF of the present principles, to make and strengthen the confidence level of malware detection events identified by the MCF.

In various embodiments, an MCF in accordance with the present principles can predict occurrences of anomalies. For example, in some embodiments, based on the local and global contexts generated by the MCF as described above, the MCF can perform a Predicting process to generate possible new local and global contexts. In some embodiments, the prediction can be based on current sensor payload results or previously observed events (e.g. anomaly occurrences stored in persistent storage). The following provides examples of prediction based on the different clustering types (e.g. locational, temporal, and behavioral).

An MCF in accordance with the present principles can perform clustering analysis based on a number of algorithms such as hierarchical connectivity model, k-means or Principal Component Analysis. Based on a distribution of payload results, a distance measure between the centroid of the distribution can be generated. The centroid information represents the statistical center of the distribution, and can be used in the Prediction process. For example, stochastic sampling of the timing of the anomaly within a sensing period may produce a predicted timing value that is statistical mean of the distribution of samples. The predicted timing value can be used by the MCF to further obtain local and global context of the at least one anomaly.

In a locational embodiment, an MCF operation can be visualized via a network map, in which an MCF determines a confidence of detection for each device based on, for example, current sensor payload results or persistent storage. In some embodiments, such results can be presented to a user via a table within an MCF report, and can be graphically viewed (e.g. graph and spoke diagrams). Using such information, the MCF can predict a next device(s) that are likely to be infected based on network connectivity and the traversal of a detected anomaly across devices on a network.

In a temporal embodiment, an MCF operation can be visualized in a 2D plot with time (x-axis) and detection confidence (y-axis). Anomaly results from sensor payloads can be associatively plotted on the graph, and as time passes, the MCF can determine correlations between sensor payload results (i. e., based on timestamps). Using a global analysis, the MCF can find many correlations between sensor payloads in regular intervals. Using such information, the MCF can predict that the next likely time period (in the future) that sensor payloads can have the next detections, that is, where and when the occurrence of an anomaly can occur.

In some embodiments, an MCF in accordance with the present principles can determine correlation using a number of statistical tests such as the Pearson's product-moment correlation coefficient, where the measure of dependence is obtained by dividing the covariance of the two payload results (variables) by the product of their standard deviations. Using this test, the MCF can, through statistical association, determine the degree in which the two payload results are related. A threshold can be set on the correlation coefficient output (e.g. to ascertain the occurrence of the anomaly).

In a behavioral example, the MCF operation can be visualized in a 2D plot with time (x-axis) and detection confidence (y-axis). In embodiments in which results from a specific sensor payload (e.g., processor-based sensor payload) can identify anomalies at regular intervals, the MCF can predict that complementary sensor payloads of similar or other types can have similar detections at a relative time period(s).

Having predicted local and global context, an MCF in accordance with the present principles can suggest or initiate appropriate remediation actions. In reference to FIG. 1, in some embodiments, the MCF 150 can request action from a list of available services. For example in some embodiments, for remediation, the MCF 150 can issue requests to or initiate a re-flash certain devices, or take appropriate action to isolate an infected device from the network. The MCF 150 can also request to or initiate a re-task of a sensor payload, for example, re-run a particular sensor payload configured to improve confidence in a detection of an anomaly. For example, in some embodiments, the MCF 150 can request or initiate a re-run of a processor-based sensor payload configured with different sampling rate of the high performance counters.

Figure 5:
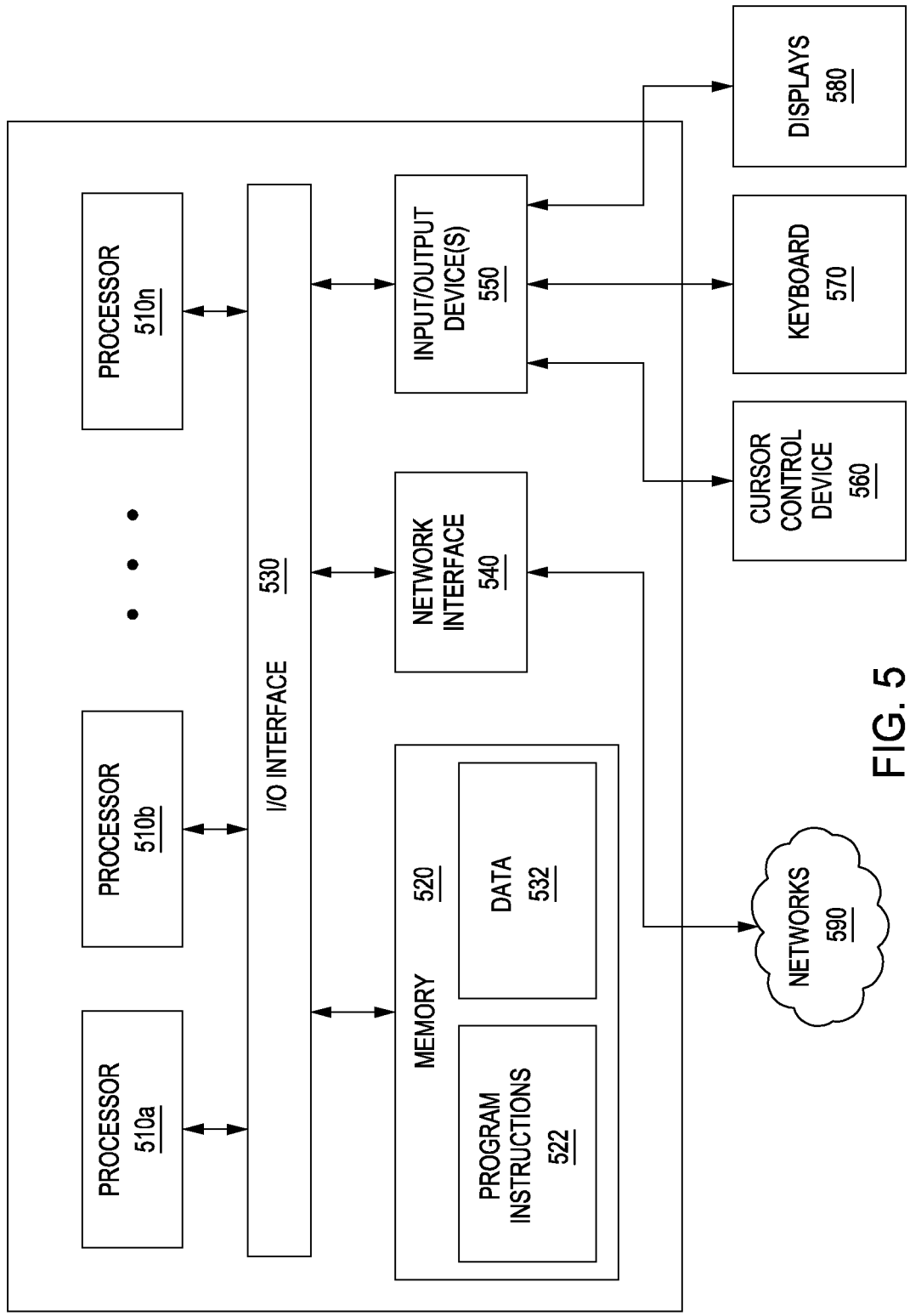
FIG. 5 depicts a high level block diagram of a computing platform suitable for use with the MCF system of FIG. 1 in accordance with an embodiment of the present principles.

FIG. 5 depicts a high level block diagram of a computing platform 160 suitable for use in the Malware Characterization Framework (MCF) system 100 of FIG. 1 in accordance with an embodiment of the present principles. In some embodiments computing platform 160 can be configured to implement the methods of the present principles as processor-executable executable program instructions 522 (e.g., program instructions executable by processor(s) 510) in various embodiments.

In the embodiment of FIG. 5, the computing platform 160 includes one or more processors 510a-510n coupled to a system memory 520 via an input/output (I/O) interface 530. The computing platform 160 further includes a network interface 540 coupled to I/O interface 530, and one or more input/output devices 550, such as cursor control device 560, keyboard 570, and display(s) 580. In various embodiments, any of the components can be utilized by the system to receive user input described herein. In various embodiments, a user interface can be generated and displayed on display 580. In some cases, it is contemplated that embodiments can be implemented using a single instance of computing platform 160, while in other embodiments multiple such systems, or multiple nodes making up computing platform 160, can be configured to host different portions or instances of various embodiments. For example, in one embodiment some elements can be implemented via one or more nodes of computing platform 160 that are distinct from those nodes implementing other elements. In another example, multiple nodes may implement computing platform 160 in a distributed manner.

In different embodiments, computing platform 160 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing platform 160 can be a uniprocessor system including one processor 510, or a multiprocessor system including several processors 510 (e.g., two, four, eight, or another suitable number). Processors 510 can be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described herein can be stored within system memory 520. In other embodiments, program instructions and/or data can be received, sent or stored upon different types of computer-accessible media or on similar media separate from system memory 520 or computing platform 160.

In one embodiment, I/O interface 530 can be configured to coordinate I/O traffic between processor 510, system memory 520, and any peripheral devices in the device, including network interface 540 or other peripheral interfaces, such as input/output devices 550. In some embodiments, I/O interface 530 can perform any necessary protocol, timing or other data transformations to convert data signals from one component (e.g., system memory 520) into a format suitable for use by another component (e.g., processor 510). In some embodiments, I/O interface 530 can include support for devices attached through various types of peripheral buses, such as a variant of the Peripheral Component Interconnect (PCI) bus standard or the Universal Serial Bus (USB) standard, for example. In some embodiments, the function of I/O interface 530 can be split into two or more separate components, such as a north bridge and a south bridge, for example. Also, in some embodiments some or all of the functionality of I/O interface 530, such as an interface to system memory 520, can be incorporated directly into processor 510.

Network interface 540 can be configured to allow data to be exchanged between computing platform 160 and other devices attached to a network (e.g., network 590), such as one or more external systems or between nodes of computing platform 160. In various embodiments, network 590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 can, in some embodiments, include one or more display terminals, keyboards, keypads, touchpads, scanning devices, voice or optical recognition devices, or any other devices suitable for entering or accessing data by one or more computer systems. Multiple input/output devices 550 can be present in the computing platform 160 or can be distributed on various nodes of the computing platform 160. In some embodiments, similar input/output devices can be separate from the computing platform 160 and can interact with one or more nodes of the computing platform 160 through a wired or wireless connection, such as over network interface 540.

In some embodiments, the illustrated computing platform 160 can implement any of the operations and methods described herein, such as the methods illustrated by the flowchart of FIG. 7 (described below). In other embodiments, different elements and data can be included.

Those skilled in the art will appreciate that computing platform 160 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing platform 160 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

In some embodiments in accordance with the present principles, a user interface (e.g., GUI) to enable a user to interact with at least the computing platform 160 and to control parameters of, for example, an MCF system and a subject system, can be provided by the computing platform 160. In some embodiments, the user interface can be implemented as a menu driven application presented on a display of, for example, the computing platform 160 of the present principles, and the and one or more input/output devices of at least the computing platform 160 can be used to provide interaction between a user of the MCF system and a subject system of the present principles and the user interface.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described herein. In some embodiments, instructions stored on a computer-accessible medium separate from computing platform 160 can be transmitted to computing platform 160 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 7:
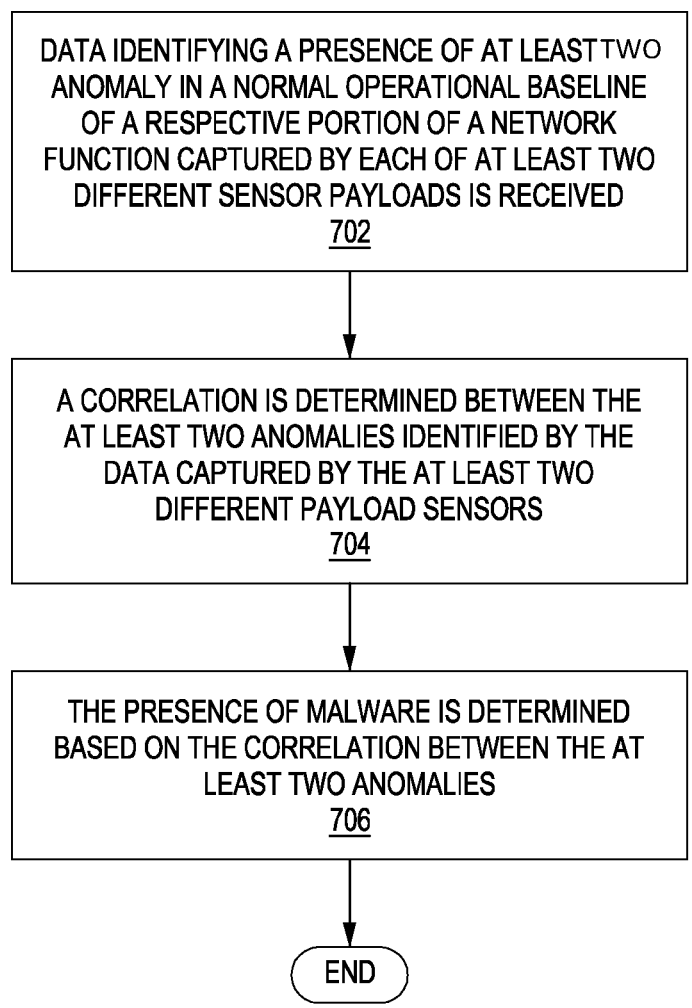
FIG. 7 depicts a high level flow diagram of method for malware characterization in accordance with an embodiment of the present principles.

FIG. 7 depicts a flow diagram of a method 700 for malware characterization in accordance with an embodiment of the present principles. The method 700 begins at 702 during which data identifying a presence of at least one anomaly of a respective portion of a processing function captured by at least one of each of at least two different sensor payloads and one sensor payload at two different times is received. For example and as described above, in some embodiments a system/device to be analyzed includes at least two sensor payloads, such as a processor-based sensor payload, a memory-based sensor payload, and a network-based sensor payload. In accordance with the present principles, each sensor payload processes collected data and provides respective results to the MCF 150, for example, in the form of metadata that describes the analysis (e.g. detection of anomalous events). The method 700 can proceed to 704.

At 704, a correlation is determined between the at least two anomalies identified by the data captured by the at least one sensor payloads. The method 700 can proceed to 706.

At 706, the presence of malware is determined based on the correlation between the at least two anomalies. The method 700 can be exited.

In some embodiments the method 700 can further optionally include at 708, recommending/initiating a remediation action. For example and as described above, in some embodiments, for remediation, the MCF 150 can issue requests to or initiate a re-flash of certain devices, or take appropriate action to isolate an infected device from the network. The MCF 150 can also request to or initiate a re-task of a sensor payload, for example, re-run a particular sensor payload configured to improve confidence in a detection of an anomaly. For example, in some embodiments, the MCF 150 can request or initiate a re-run of a processor-based sensor payload configured with different sampling rate of the high performance counters.

In some embodiments the method 700 can further optionally include at 710, reporting results of the MCF process to a user. For example and as described above, in some embodiments the optional reporter module 140 can generate a Report based on a format provided by a Report Template (see FIG. 1) to be presented to a user. In some embodiments, the report can be a human readable file including summary of the results of an MCF analyses. The reports can be time-stamped for future analysis and archival purposes. In some embodiments, the optional reporter module 140 can also generate metadata for visualization via a GUI service that can be provided by, for example, the computing platform 160.

In some embodiments the method 700 can further optionally include at 712, predicting an occurrence of at least one anomaly in the network. For example and as described above, in some embodiments, based on the local and global contexts generated by the MCF as described above, the MCF can perform a Predicting process to generate possible new local and global contexts. In some embodiments, the prediction can be based on current sensor payload results or previously observed events (e.g. anomaly occurrences stored in persistent storage). In some embodiments the predicting can be based on at least one of a locational-based clustering, a device configuration data correlation, a logic setting correlation, a temporally-based clustering, and a behavioral-based clustering.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing platform or a "virtual machine" running on one or more computing platforms). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for malware characterization, comprising:
receiving data identifying a presence of at least two anomaly occurrences in operating functions of a network captured by at least one of two different sensor payloads or one sensor payload at two different times, wherein the operating functions of the network comprise at least one of a processor-based function, a memory-based function, or a network-based function;
correlating the received captured data to determine if the at least two anomaly occurrences occurring in a same or different operating functions of the network at different times are related anomaly occurrences caused by a same source;
in response to the determination that the at least two anomaly occurrences are related anomaly occurrences caused by the same source, making a determination that there is a presence of malware in at least one operating function of the network and automatically identifying the malware;
predicting at least one of a time of occurrence or a location of occurrence in the network of another anomaly based on the correlation; and
in response to at least one of the determination of the presence of malware, the automatic identification of the malware, or the prediction of the at least one of the time of the occurrence or the location of the occurrence of the other anomaly, performing a remediation action including transmitting an electronic communication to a sensor payload to initiate a remediation action in the network.

2. The method of claim 1, wherein the transmitting an electronic communication to a sensor payload to initiate a remediation action in the network comprises at least one of requesting to or re-flashing a device of the network, requesting to or isolating an infected device from the network, and requesting to or re-tasking at least one of the at least two different sensor payloads or the one sensor payload.

3. The method of claim 1, further comprising:
generating a report including a summary of a result of the malware characterization method of claim 1.

4. The method of claim 3, wherein the report comprises a human readable file.

5. The method of claim 1, wherein the correlation comprises at least one of a locational-based correlation, a memory structure correlation, a device configuration data correlation, a logic setting correlation, a temporally-based correlation, a packet/data-based correlation, a behavioral-based correlation, and a device-based correlation.

6. The method of claim 1, wherein the predicting is based on current sensor payload data or on previously observed and stored sensor payload data.

7. The method of claim 1, wherein the predicting is based on at least one of a locational-based clustering, a temporally-based clustering, and a behavioral-based clustering.

8. The method of claim 1, wherein at least one of the at least two anomalies anomaly occurrences is identified by comparing the data captured by at least one sensor payload to a normal operational baseline profile of the operating function.

9. The method of claim 8, wherein the normal operational profile is determined using at least one of a machine learning process and an inferred specification process.

10. An apparatus for malware characterization, comprising:
a receiving/clustering module configured to:
receive data identifying a presence of at least two anomaly occurrences in operating functions of a network captured by at least one of two different sensor payloads or one sensor payload at two different times, wherein the operating functions of the network comprise at least one of a processor-based function, a memory-based function, or a network-based function;
correlate the received captured data to determine if the at least two anomaly occurrences occurring in a same or different operating functions of the network at different times are related anomaly occurrences caused by a same source; and
in response to the determination that the at least two anomaly occurrences are related anomaly occurrences caused by the same source, make a determination that there is a presence of malware in at least one operating function of the network and automatically identify the malware;
predict at least one of a time of occurrence or a location of occurrence in the network of another anomaly based on the correlation;
and
a recommendations module configured to, in response to at least one of the determination of the presence of malware, the automatic identification of the malware, or the prediction of the at least one of the time of the occurrence or the location of the occurrence of the other anomaly,
perform a remediation action including transmitting an electronic communication to a sensor payload to initiate a remediation action in the network.

11. The apparatus of claim 10, wherein the receiver/clustering module comprises a local state mapping/clustering module to receive at least a portion of the data identifying the presence of the at least two anomaly occurrences in the processing function from at least one of the sensor payloads and a global/historical analysis module to receive at least a portion of the data identifying the presence of the at least two anomaly occurrences in the processing function from a storage device.

12. The apparatus of claim 10 wherein the recommendations module is configured to at least one of recommend and initiate a remediation action comprising at least one of requesting to or re-flashing a device, requesting to or isolating an infected device, and requesting to or re-tasking a sensor payload.

13. The apparatus of claim 10, further comprising a reporter module to generate a report including a summary of a result of the receiving/clustering module.

14. The apparatus of claim 10, wherein the receiving/clustering module is further configured to predict an occurrence of at least one anomaly in the processing function based on at least one of current sensor payload data and previously observed and stored sensor payload data.

15. The apparatus of claim 10, wherein the apparatus is embedded in a computing platform.

16. The apparatus of claim 10, wherein a presence of at least one anomaly is determined by the receiving/clustering module.

17. The apparatus of claim 10, wherein a presence of at least one anomaly is determined by at least one sensor payload.

18. The apparatus of claim 10, wherein the at least two anomaly occurrences are identified by comparing the data captured by at least one of the sensor payloads to a normal operational baseline profile of the processing function.

19. The method of claim 1, further comprising:
initiating a capture of additional sensor payload data, before the performing of the action for remediating the existence of the malware, to assist in determining if a correlation exists between the at least two anomalies.

20. The apparatus of claim 10, wherein the recommendations module is further configured to initiate a capture of additional sensor payload data, before the performing of the action for remediating the existence of the malware, to assist in determining if a correlation exists between the at least two anomalies.

* * * * *